A. G. Buzby.

Steam Safety-Valve.

No. 3535 Reissued July 6, 1869.

Witnesses
Wm. A. Stel.
Mowbotham

Inventor
A. G. Buzby
per Thos. Hay
W. H. Horstman

UNITED STATES PATENT OFFICE.

ALBERT G. BUZBY, OF PHILADELPHIA, PENNSYLVANIA.

IMPROVEMENT IN SAFETY-VALVES.

Specification forming part of Letters Patent No. 76,992, dated April 21, 1868; Reissue No. 3,535, dated July 6, 1869.

*To all whom it may concern:*

Be it known that I, ALBERT G. BUZBY, of Philadelphia, Pennsylvania, have invented a Duplex Safety-Valve for Boilers; and I do hereby declare the following to be a full, clear, and exact description of the same.

My invention consists, first, of a safety-valve chest having two seats adapted for the reception of two separate valves; secondly, of two valves, one being connected to but loaded independently of the other; and, thirdly, in the combination, with the said valve-chest and valves, of a cover or casing so arranged that if the lever of one valve should be tampered with or fail to perform its functions, the other valve remains in an inaccessible position to relieve the boiler of surplus steam, all of which is fully described hereinafter.

In order to enable others skilled in the art to make and apply my invention, I will now proceed to describe its construction and operation, reference being had to the accompanying drawings, which form a part of this specification, and in which—

Figure 1:
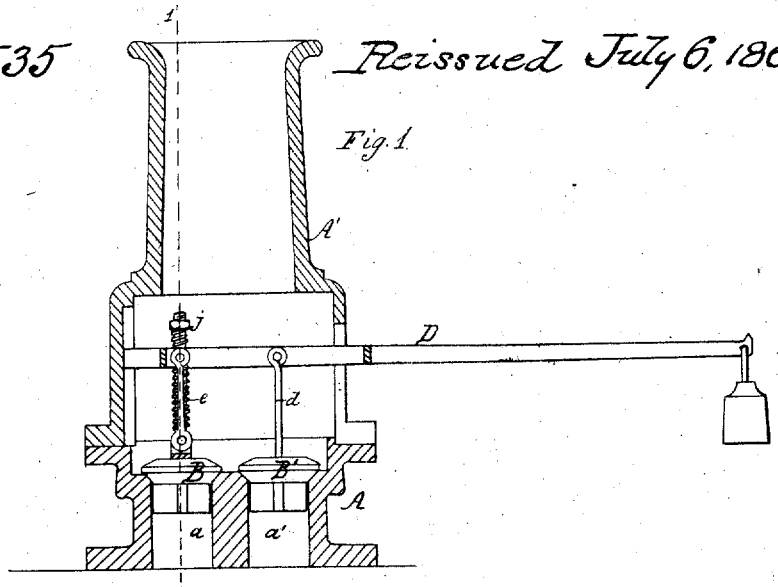
Figure 2:
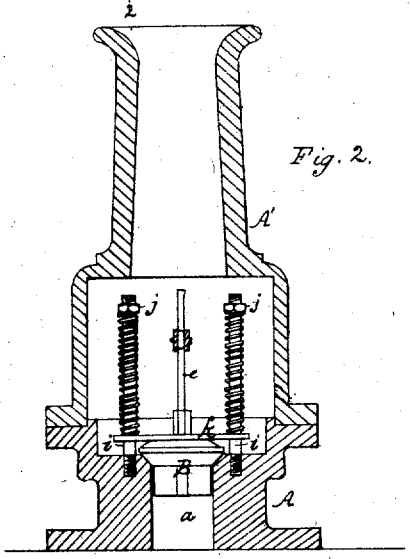
Figure 3:
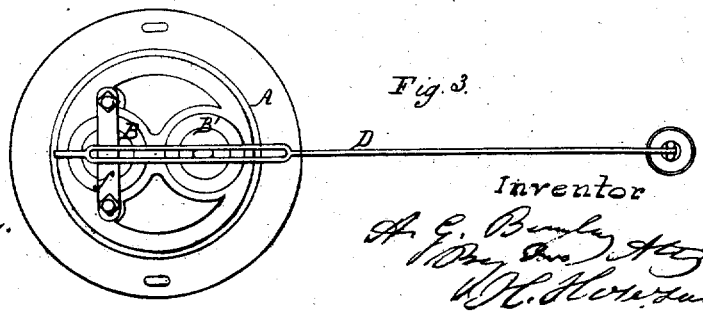

Figure 1 is a vertical section of my improved safety-valve; Fig. 2, a section on the line 1 2, Fig. 1; and Fig. 3 a plan view with a portion of the case removed.

Similar letters refer to similar parts throughout the several views.

A is the lower, and A′ the upper, portion of a valve chest or case, the lower portion being secured to a steam-generator, and having two openings, *a* and *a′*, which communicate independently. At the upper edge of the opening *a* is formed a seat for the valve B, and at the upper edge of the opening *a′* a seat for the valve B′.

To a graduated and weighted lever, D, is jointed a link or rod, *d*, the lower end of which is connected to or rests on the valve B′, and a link, *e*, serves to connect the same lever to the valve B, on which is a cross-bar, *f*, the latter being arranged to slide vertically on rods *i i*, secured below to the valve-chest, and provided at the top with nuts *j j*, between which and the said cross-bar *f* intervene spiral springs coiled around the rods *i i*. The lever D is loaded, as usual, so that the valve B′ will not be elevated until the steam within the boiler exceeds a given pressure, when the lever will be raised, its fulcrum being the pin to which the link *e* of the valve B is connected. The springs or the appliances for loading the valve B are such that the latter is depressed with a force slightly in excess of that exerted on the valve B′, so that under ordinary circumstances the valve B will remain stationary, while the valve B′ will perform its duty of permitting an excess of steam to escape. Should the valve B, however, adhere to its seat, no accident can possibly occur, as a slight increase of pressure over that required to lift the valve B′ will raise the valve B and permit the escape of the steam. This is one of the principal features of the invention and my main object in arranging two valves side by side upon a single chest. Another advantage arising from the employment of two valves arranged as above is that if a dangerous excess of steam should be suddenly generated, both valves will be elevated and the boiler quickly relieved. The above objects can, however, be attained without employing the cover or casing A′, and even if the valves are disconnected and loaded independently; but when the valves are loaded and connected together in the manner above described, and are covered by the casing A′, (which is so constructed as to permit the free escape of the steam, but so as to prevent access to the valve B,) another and most important object is gained—namely, the prevention of any tampering with the valves. Should the lever D, which projects through a slot in the casing A′, be overweighted or held down, the valve B, to which ready access cannot be had, remains to perform its duty, which it will do independently of the lever, as it has an independent load.

I claim as my invention and desire to secure by Letters Patent—

1. The valve-chest A, having openings and seats, on which rest two separate safety-valves, B B′, substantially as herein described.

2. The two valves B and B′, the former being connected to but loaded independently of the valve B′, when the said valves are arranged upon a single chest, A, substantially as and for the purpose specified.

3. The casing or cover A′, in combination with the two valves B B′, arranged on a single chest, A, substantially as described.

In testimony whereof I have signed my name to this specification before two subscribing witnesses.

A. G. BUZBY.

Witnesses:
E. H. BAILEY,
HARRY SMITH.